April 5, 1927.  H. A. BITTICK  1,623,823
MANUALLY CARRIED TRANSPORTING DEVICE FOR ELECTRICAL CONDUCTORS
Filed July 11, 1925
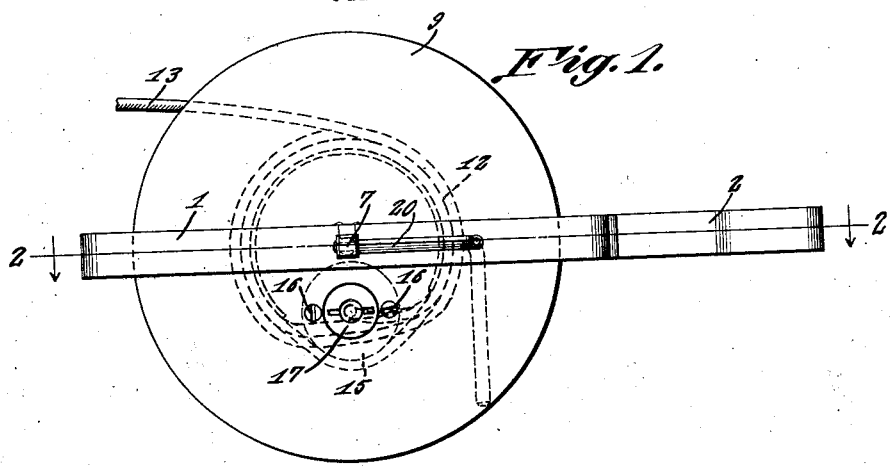
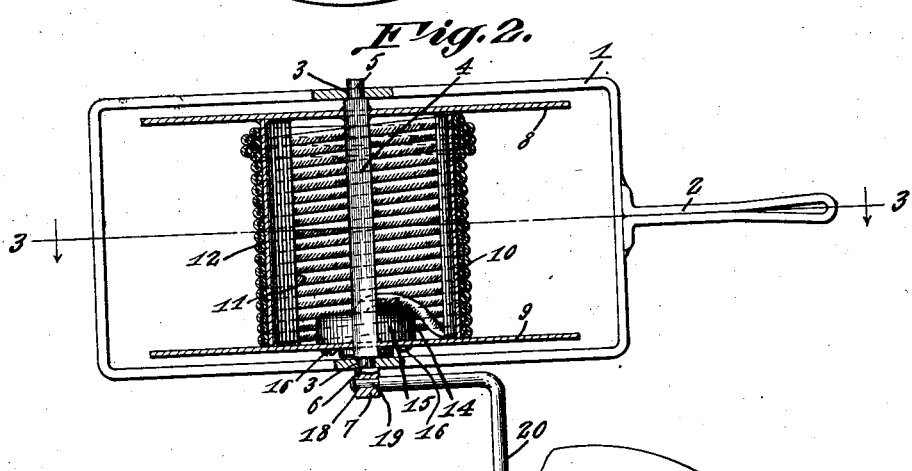
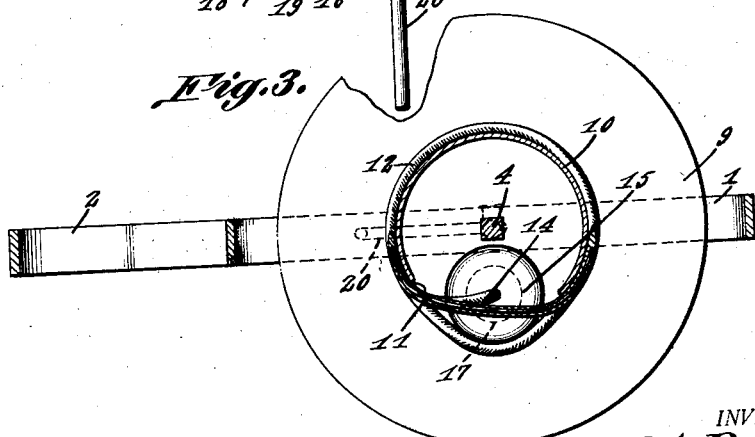
INVENTOR.
H. A. Bittick,
BY
Geo. F. Kimmel,
ATTORNEY.

Patented Apr. 5, 1927.

1,623,823

UNITED STATES PATENT OFFICE.

HALTON A. BITTICK, OF TAYLOR, TEXAS.

MANUALLY-CARRIED TRANSPORTING DEVICE FOR ELECTRICAL CONDUCTORS.

Application filed July 11, 1925. Serial No. 43,051.

This invention relates to a manually carried transporting device for an electrical conductor and is designed primarily for use in making night demonstrations when endeavoring to dispose of house lighting plants for the average farm house, but it is to be understood that a device, in accordance with this invention, can be employed for any purposes for which it is found applicable, and the invention has for its object to provide, in a manner as hereinafter set forth, a device of the class referred to for expeditiously and conveniently getting current into a house from an outside source for the purpose of demonstrating a lighting plant therefor.

A further object of the invention is to provide, in a manner as hereinafter set forth, a manually carried transporting device for an electrical conductor capable of having the conductor carried thereby conveniently connected to a source of supply carried by an automobile and including means whereby the conductor can be manually carried from said source into a house, and further including means whereby a lighting plant can be electrically connected with the conductor so that a demonstration of said plant can be had.

Further objects of the invention are to provide, in a manner as hereinafter set forth, a manually carried transporting device for an electrical conductor, which is simple in its construction and arrangement, capable of being carried when not in use, in a small box on the running board of an automobile or stored in a small space therein, strong, durable, conveniently transported to a point for connection therewith of the plant to be demonstrated, thoroughly efficient in its use, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation of a manually carried transporting device for an electrical conductor in accordance with this invention.

Figure 2 is a section on line 2—2, Figure 1.

Figure 3 is a section on line 3—3, Figure 2, partly broken away.

Referring to the drawings in detail, 1 denotes a rectangular frame having welded to one end thereof a handle member 2 to provide for manually carrying the device from point to point. Each of the side bars of the frame 1, at the center thereof, is provided with an opening 3, and journalled in each of the openings 3, as well as extending from each of the side bars of the frame 1 is a cylindrical portion of a polygonal-shaped shaft 4. One of the cylindrical portions of the shaft 4 is indicated at 5 and the other at 6, and this latter portion terminates in a squared head 7 of a width greater than the diameter of the cylindrical portion 6.

The shaft 4 forms an element of a spool and the latter further includes a pair of circular disks or heads 8, 9, and each of the latter is fixed to the polygonal portion of the shaft 4, in proximity to a cylindrical portion and is of a diameter less than the length of the frame 1. Arranged between the disks 8, 9, as well as being fixedly secured to the inner faces thereof, is a supporting member 10 bent in circular form and having the side edges thereof spaced from each other to form a passage, indicated at 11, so that access can be had to the interior of the supporting member 10 when the latter is secured to the disks.

A flexible conductor 12 is adapted to wind off and on the supporting member 10, and the latter maintains said conductor spaced from the shaft 4. The outer end of the conductor 12, which is indicated at 13, is adapted to be connected to a battery carried by an automobile, and the inner end of the conductor 12, which is indicated at 14, is connected to a plug 15, which is secured against the inner face of the disk 9 by the hold-fast devices 16 and further extends through an opening 17 formed in the disk 9, and spaced from the shaft 4

The head 7 is provided with an opening 18 and in which is pivotally connected the reduced end 19 of the angle-shaped crank or handle 20, which is employed for revolving the shaft 4 for the purpose of winding the conductor 12 on the supporting member 10. When the handle 20 is not used, it is swung to the position shown in dotted lines in Figure 1, so that one of the arms of the handle will be disposed in parallelism with respect to the disk 9, and when the handle is used it is shifted to the position shown in Figure 2 and also to the position shown in full lines in Figure 1.

The passage 11 provides means for positioning the plug 15 in the disk 9 and also to permit of the inner end of the conductor 14 extending inwardly towards the plug 15. When the conductor 12 is wound on the support 10, a length thereof extends across the passage 11 and a plurality of lengths are positioned against the plug 15. See Figure 3. However, plug 15 can be of a diameter and the opening 17 so arranged whereby the conductor 12 will not engage the plug 15 when the conductor is wound on the support or reeled up.

The plug 15 is provided for the purpose of connecting a lighting plant with the source of electrical energy so that a demonstration of the plant can be had.

When the device is not used, it is stored on an automobile. When a demonstration is to be had of a lighting plant, the handle member 2 is grasped by the operator and the device transported to the point desired, that is to say, into the room of a farm house. As the device is carried from the automobile the conductor 12 unwinds and after the operator has reached the desired point, the lighting plant is connected to the plug 15 and the demonstration is had. After the demonstration has been had and the lighting plant detached from the plug 15, the operator winds up the conductor 12 on the support 10 by revolving the spool through the medium of the crank 20, and after the conductor has been wound to the desired extent, the device is stored in the automobile or in a small box carried by the latter.

It is thought that the many advantages of a manually carried transporting device for an electrical conductor, in acordance with this invention, can be readily understood, and although the preferred embodiment of the invention is as illustrated and described, yet it is to be understood that changes in the details of construction can be had which will fall within the scope of the invention as claimed.

What I claim is:—

1. A manually carried transporting device for an electrical conductor comprising a revoluble shaft manually operated in one direction for winding an electrical conductor having its outer end anchored to a source of electrical supply, a pair of spaced disks fixed to said shaft and one provided with an opening adjacent the axis thereof, a lengthwise split, cylindrical supporting member for receiving the windings of the conductor, said member secured to the inner faces of said disks, surrounding and spaced from said shaft and having the edges of the split thereof spaced a substantial distance from each other to provide a passage for the inner end terminal portion of the electrical conductor wound on said member, a circuit closing means mounted in said opening and extending inwardly therefrom into said passage and adapted to have the inner end terminal portion of said conductor electrically connected thereto, and said means adapted to have its outer end electrically connected with a device to receive the current from the conductor when the latter is wound off of said member.

2. A manually carried transporting device for an electrical conductor comprising a revoluble shaft manually operated in one direction for winding an electrical conductor having its outer end anchored to a source of electrical supply, a pair of spaced disks fixed to said shaft and one provided with an opening adjacent the axis thereof, a lengthwise split, cylindrical supporting member for receiving the windings of the conductor, said member secured to the inner faces of said disks, surrounding and spaced from said shaft and having the edges of the split thereof spaced a substantial distance from each other to provide a passage for the inner end terminal portion of the electrical conductor wound on said member, a circuit closing means mounted in said opening and extending inwardly therefrom into said passage and adapted to have the inner end terminal portion of said conductor electrically connected thereto, said means adapted to have its outer end electrically connected with a device to receive the current from the conductor when the latter is wound off of said member, a frame for revolubly supporting said shaft, and a handle integral with one end of said frame and providing means for manually carrying the frame to operate said shaft in an opposite direction to unwind the conductor from said member.

3. A manually carried transporting device for an electrical conductor comprising a revoluble shaft operating in one direction for winding an electrical conductor having its outer end anchored to a source of electrical supply, a manually transported supporting means for said shaft and providing when transported to revolve the shaft in the opposite direction to provide for the unwinding of said conductor, a pair of spaced disks fixed to said shaft and one provided with an opening adjacent the axis thereof, a supporting member for receiving the coils of the conductor and surrounding said shaft and further secured to the inner faces of said disks and provided with means to form a clearance for the inner end terminal portion of the conductor when wound on said member, and a circuit closing means mounted in and extending inwardly from said opening into said clearance and adapted to have the inner end terminal portion of the conductor connected therewith and further adapted to have its outer end electrically connected with a device to receive the current from the conductor when the manually transported supporting means is carried to operate the shaft in the opposite direction to unwind the conductor.

In testimony whereof, I affix my signature hereto.

HALTON A. BITTICK.